CLAMPING DEVICE FOR ELECTRONIC DISCHARGE DEVICES

Filed March 27, 1950

*INVENTOR.*
ROBERT R. CHAPMAN
*BY*
George H Fisher
*ATTORNEY*

United States Patent Office 2,701,866

Patented Feb. 8, 1955

2,701,866

CLAMPING DEVICE FOR ELECTRONIC DISCHARGE DEVICES

Robert R. Chapman, Minneapolis, Minn., assignor to Minneapolis-Honeywell Regulator Company, Minneapolis, Minn., a corporation of Delaware Application March 27, 1950, Serial No. 152,158

3 Claims. (Cl. 339—75)

In the present-day portable, mobile, and aircraft radio equipment there are numerous types of metal and glass electronic discharge devices, more familiarly known as electronic tubes, that may be subjected to continuous vibration and frequent extreme shock. These metal and glass electronic discharge devices are designed primarily to be mounted with the external prongs of the device placed into a socket when the discharge device is connected for operation. The prong and socket connection is frequently not of sufficient strength to support the electronic discharge device during normal use in many applications.

In the operation of such electronic discharge devices, the physical position of the various elements inside the tube is of great importance. Any shock or vibration which can strain the internal construction of such devices often results in the faulty operation of the device. The socket electrical connection for such electronic devices constitutes a vital part of a system when the device is used in complicated electronic equipment. Any loose or intermittent connection in the socket can result in the failure of proper operation of the associated equipment.

Such electronic discharge devices, while being small in physical size, often control relatively large amounts of power. As a result, the operating temperatures are often high and a means of dissipating heat from such devices can contribute to proper operation.

My invention employs the use of two semicylindrical metallic members that are connected to a common base and are formed to engage the opposite, outside surface of an electronic discharge tube. The two members can be locked together to form a metallic casing around the tube. This metallic enclosure provides a rigid support to hold the tube in the associated socket, an increased heat radiation surface for the tube, and a heat transfer path from the tube to the common mounting base.

The object of the present invention is to provide a clamping device for increasing the stability of an electronic discharge device when such a device is mounted on associated equipment by means of the external prongs of the device and a socket of the associated equipment.

A further object of the present invention is to provide a clamping device for enlarging the heat radiation area of the discharge device. This radiation surface will dissipate considerable heat, and therefore decrease the operation temperature of the electronic tube.

A still further object of the present invention is to provide a clamping device that embodies a metallic heat transfer path from the electronic discharge device to the mounting base. The metallic path is to conduct heat from the tube; thereby the operation temperature of the electronic tube will be lowered.

A still further object of the present invention is to provide a clamping device that is readily removable when accessibility to the electronic discharge device is desired. It is anticipated that such electronic devices may be mounted within congested surroundings; therefore the clamping device is adapted to be removed without the assistance of tools.

Another object of the present invention is to provide a clamping device that has a means for adjusting the position of the clamping device with respect to the electronic discharge device. Such adjustment provides for a limited amount of variation in the position and the size of the electronic discharge device when mounted in the associated socket.

These and other objects of the present invention will be disclosed in the course of the following specification, reference being made to the accompanying drawings. The present invention consists of two different embodiments. The Figures 1 and 2 are of the first embodiment of the present invention and the Figures 3, 4 and 5 are of the second embodiment of the present invention.

Figure 1:
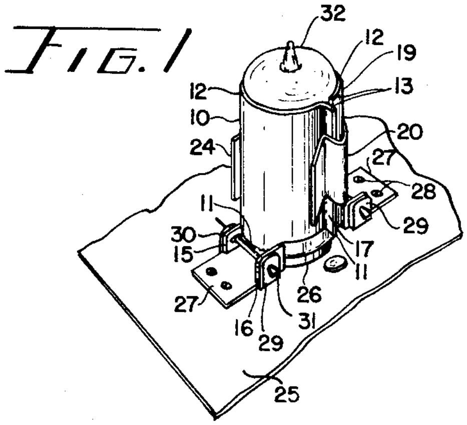
Figure 1 is a perspective view of a first embodiment of the invention having the two metallic members hinged about the common base and latched in a position to surround the electronic tube with a rigid embracing enclosure.
Figure 2:
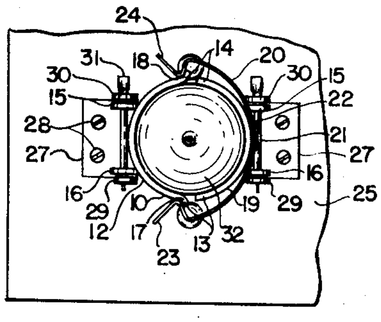
Figure 2 is a plan view of the first embodiment of the invention showing the metallic enclosure surrounding the electronic tube.

Referring to Figures 1 and 2 of the first embodiment of the invention, the clamping device embodies a pair of semicylindrical members forming a hollow cylinder of thin black sheet metal which has a high thermal conductivity about an electron discharge tube. The first of the pair of described semicylindrical members 10 has a lower edge 11, an upper edge 12, and two diametrically opposite vertical edges 13 and 14. Portions adjacent the lower edge 11 of the first semicylindrical member 10 are cut away and bent back to form two ears 15 and 16 such that the plane of each ear is perpendicular to a plane through the two vertical edges 13 and 14 and parallel to the vertical edges 13 and 14. Each of the two ears 15 and 16 contains an oblong hole whose long diameter is perpendicular to a plane containing the vertical edges 13 and 14. The two vertical edges 13 and 14 of the first semicylindrical member 10 are turned slightly outward from the cylinder axis to form two small flanges 17 and 18 which are contained on the complete length of both the vertical edges 13 and 14. A second semicylindrical member 19, being similar to the member 10, has a lower edge 11, an upper edge 12, two diametrically opposite vertical edges 13 and 14, two ears 15 and 16 and a spring clip 20. The spring clip 20 consists of a long section of flat spring metal and is connected at its mid-point to the second semicylindrical member 19, with a rivet 21 and a washer 22 interposed between the rivet and the wall of member 19, at a point approximately mid-way between the lower edge 11 and upper edge 12 and half way between the vertical edges 13 and 14 on the periphery of the semicylindrical member 19. The spring clip 20 is formed symmetrically about the outside surface of the second semicylindrical member 19. The opposite ends of the spring clip 20 extend past the vertical edges 13 and 14 and are bent first inwardly toward the axis of the cylinder formed by members 10 and 19 and then extended outwardly to form similar ears 23 and 24.

A mounting base 25 contains a tube socket 26 which in this particular case is riveted to the mounting base 25. The tube socket 26 is adapted to receive a suitable electronic discharge tube 32. Two hinge plates 27, each made of a flat piece of thin sheet metal also having a high thermal conductivity, are fastened to the mounting base 25, with suitable screw threaded fastening means 28. A portion of the opposite edges of each of the hinge plates 27 is turned up to form two similar separate parallel ears 29 and 30 that are contained in planes that are perpendicular to the mounting base 25. A round hole in each of the ears 29 and 30 is made to accommodate a pivot rod 31. The hinge plates 27 are mounted oppositely and adjacent to the tube socket 26 so that the pivot rods 31 are parallel to each other and to the mounting base 25.

The first semicylindrical member 10 and the second semicylindrical member 19, when placed so that the ears 15 and 16 are aligned with the ears 29 and 30 of the hinge plates 27, are pivotally connected to the hinge plates 27 by means of the pivot rods 31 passed through the associated holes, and together form a metal cylindrical casing about the electronic discharge tube 32 mounted in the associated tube socket 26. By means of the hinge plates 27, pivot rods 31 and associated ears 15, 16, 29 and 30, the two semicylindrical members 10 and 19 can be pivoted to and from each other about the pivot rod 31. This movement provides accessibility to the electronic discharge tube 32 when it is to be placed in or removed from socket 26.

The oblong holes in each of the ears 15 and 16 of the two semicylindrical members 10 and 19 provide for movement of the two semicylindrical members as a unit parallel to the mounting base 25, thus resulting in an adjustment for any limited amount of variation in the position of the body of the electronic discharge tube 32 in relation to the tube socket 26.

When the two semicylindrical members 10 and 19 are positioned about the electronic discharge tube 32, the spring clip 20 provides a means of rigidly embracing the electronic discharge tube 32 by the ears 23 and 24 latching onto the flanges 17 and 18 of the semicylindrical member 10.

The two semicylindrical members 10 and 19 provide an enlarged heat radiation surface for the electronic discharge tube 32 as well as a thermal conductive path from the electronic discharge tube 32, to the two semicylindrical members 10 and 19, through the hinge assemblies, to the hinge plates 27 and mounting base 25. The black surface of the two semicylindrical members 10 and 19 is to improve the heat transfer from the tube 32 to the members 10 and 19 as well as to improve the heat radiation from the members 10.

Figure 3:
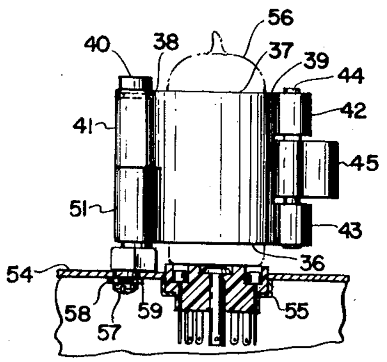
Figure 3 is a front elevation view of a second embodiment of the invention having the two metallic members hinged on a vertical shaft and latched in a position to enclose the electronic tube in a supporting manner.
Figure 4:
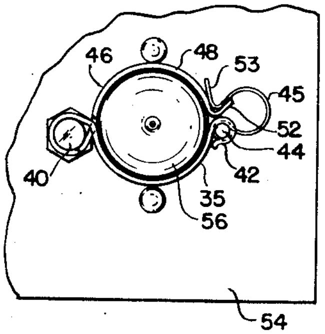
Figure 4 is a plan view of the embodiment of Figure 3 showing the metallic enclosure embracing the electronic tube.
Figure 5:
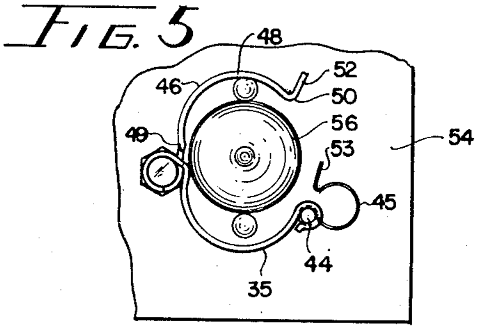
Figure 5 is a plan view of the same embodiment showing the metallic members released in an open position providing accessibility to the electronic tube.

Referring to the Figures 3, 4 and 5 of the second embodiment of the invention, the clamping device embodies a pair of semicylindrical members forming a hollow cylinder of thin, black sheet metal which has a high thermal conductivity about an electronic discharge tube. The first of the pair of described semicylindrical members 35 has a lower edge 36, an upper edge 37 and two diametrically opposite vertical edges 38 and 39. The upper half portion of the vertical edge 38 of the first semicylindrical member 35 is extended and formed around a pivot pin 40 thereby forming a hinge means 41 on which the first semicylindrical member 35 is pivoted parallel to the plane containing the upper edge 37 of the semicylindrical member 35. Two separated portions, an upper portion 42 a lower portion 43, of the second vertical edge 39 of the semicylindrical member 35 are extended and formed around a rod 44, thereby supporting the rod 44 firmly to the semicylindrical member 35 adjacent the vertical edge 39. About the center of the rod 44 and between the upper portion 42 and lower portion 43 of the vertical edge 39, a spring clip 45 is attached to pivot about rod 44.

The second semicylindrical member 46, having a lower edge 47, not shown on front elevation or plan views, an upper edge 48 and two diametrically opposite vertical edges 49 and 50, is similarly pivoted about the pivot pin 40 by a portion of the lower half of the vertical edge 49 extended and formed about the pivot pin 40, in the reverse direction of the hinge means 41, to compose a second hinge means 51. The second vertical edge 50 of the second semicylindrical member 46 is extended outwardly, in a direction away from the axis of the cylinder formed by the two semicylindrical members, to form a flange 52 adjacent to the vertical edge 50. The spring clip 45 is constructed of a long rectangular piece of thin spring metal that is formed into a U shaped clip one end being pivoted on the rod 44 and the opposite end having an ear 53.

The pivot pin 40 is mounted perpendicularly to a mounting base 54 and adjacent to the tube socket 55. With the pivot pin 40 attached to the mounting base 54 and the electronic discharge tube 56 properly mounted in the tube socket 55, the two semicylindrical members 35 and 46, being pivoted about the pivot pin 40, surround the electronic discharge tube 56. When the spring clip 45 on the first semicylindrical member 35 is forced over the flange 52 of the second semicylindrical member 46 the two semicylindrical members 35 and 46 compose a rigid casing about the periphery of the electronic discharge tube 56 holding the same on the mounting base 54. The two semicylindrical members 35 and 46 can be released and swung open about the axis of the pivot pin 40, thereby providing sufficient accessibility to the electronic discharge tube 56.

When the two semicylindrical members 35 and 46 are engaged about the electronic discharge tube 56, the clamping device provides an increased heat radiation surface for the electronic tube 56 as well as a thermal conductive path through the two semicylindrical members 35 and 46 to the pivot pin 40 and the mounting base 54. The black surface of the semicylindrical members 35 and 46 is to improve the heat transfer from the tube 56 to the two members 35 and 36 as well as to improve the radiation from the members 35 and 36.

The pivot pin 40 is mounted to the mounting base 54 by a screw 57. A hole placed eccentrically in the lower end of the pivot pin 40 is adapted to receive the screw 57. The hole is surrounded by a circular shoulder or spacer 58 whose height exceeds the thickness of the mounting base 54 and whose outside diameter is less than an associated hole in the mounting base 54. When the pivot pin 40 is mounted on the mounting base and the circular shoulder 58 is in the hole in the mounting base 54, the screw 57 is received in the hole at the lower end of the pivot pin 40. With the screw 57 tightened and a washer 59 interposed between the screw and the shoulder or spacer 58, the pivot pin 40 is free to rotate about the axis of screw 57 and change its adjacent position with respect to the axis of the electronic discharge tube 56. The above adjustment, as well as the rotation of the semicylindrical members 35 and 46, when engaged as a unit by means of the spring clip 45 about the pivot pin 40, provides an adjustment of the clamping member parallel to the mounting base to compensate for variations in the electronic discharge tubes that are used to replace the present electronic tube 56 on its failure.

Although two particular embodiments of the invention have been described, it is to be understood that the description has been done by example only. By various changes in detail and construction, it is possible to modify the present invention without departing from the appended claims in which I claim:

1. An electronic tube clamping device comprising in combination: a common base; an electronic tube and socket, means connecting said socket to said common base; a pair of curved members having good thermal conductivity arranged about an axis perpendicular to said base; shaft means pivotally supporting said pair of curved members on said shaft parallel to said axis; a latch member on one of said curved members to engage a flange of the second of said curved members, said curved members when latched together forming a casing adapted to engage said electronic tube in a heat conductive manner over a major portion of the surface thereof, and to support the electronic tube in a rigid manner with the axis of the tube in coincidence with said previously named axis; and eccentric mounting means for connecting said shaft means to said base and having an axis perpendicular to said base, said eccentric mounting means allowing lateral movement of said shaft means in respect to said base and completing a heat conductive path from the electronic tube to said base.

2. A clamping device for an electronic discharge device comprising in combination; a mounting base; a receptacle arranged to receive the electronic discharge device; a shaft, said shaft having a central axis; mounting means adapted to be received by said shaft at the lower end thereon and to attach said shaft to said mounting base, said mounting means having an axis displaced from said central axis by a predetermined amount to enable lateral adjustment of said shaft with respect to said base; a pair of members of good thermal conductivity pivotally connected to said shaft, said members being formed to oppositely engage the electronic discharge tube over a large portion of the area thereof, said members rigidly supporting the electronic discharge device on said mounting base and completing a conductive heat transfer path to said mounting base; and latch means, said latch means rigidly coupling said members.

3. An electronic tube clamping device comprising in combination: an electronic tube and socket; a common mounting base; means connecting said socket to said base; a plurality of semicylindrical members having good thermal conductivity pivotally supported by one edge thereof and arranged to engage oppositely said electronic discharge tube in thermal conductive engagement over a large portion of the surface of said tube; hinge means connecting said members to a common base and providing for movement of said members transversely toward and from said electronic discharge device; pivot means connecting said hinge means to said common mounting base, said pivot means providing for limited movement of said cylindrical members in all directions in a plane parallel to said common base; and latch means connecting said members so that said electronic discharge device is firmly held in its operating position by said members.

References Cited in the file of this patent

UNITED STATES PATENTS

| | | |
|---|---|---|
| 664,352 | Gibbs | Dec. 18, 1900 |
| 1,471,985 | Tower | Oct. 23, 1923 |
| 1,708,935 | Christopher | Apr. 16, 1929 |
| 1,716,530 | Oliver | June 11, 1929 |
| 1,930,524 | Laport | Oct. 16, 1933 |
| 2,392,410 | Reinschmidt | Jan. 8, 1946 |
| 2,432,435 | Millette | Dec. 9, 1947 |
| 2,441,420 | Karlin | May 11, 1948 |
| 2,505,840 | Shonnard | May 2, 1950 |
| 2,514,313 | Davidson | July 4, 1950 |
| 2,529,279 | Breisch | Nov. 7, 1950 |
| 2,543,740 | Ridgely, Jr. | Feb. 27, 1951 |
| 2,601,027 | Keim | June 17, 1952 |

FOREIGN PATENTS

| | | |
|---|---|---|
| 570,458 | Great Britain | of 1945 |